Aug. 20, 1957　　　　J. F. FOSTER　　　　2,803,102
COTTON HARVESTER WITH ANTI-CLOGGING MEANS
Filed Feb. 16, 1954　　　　3 Sheets-Sheet 1
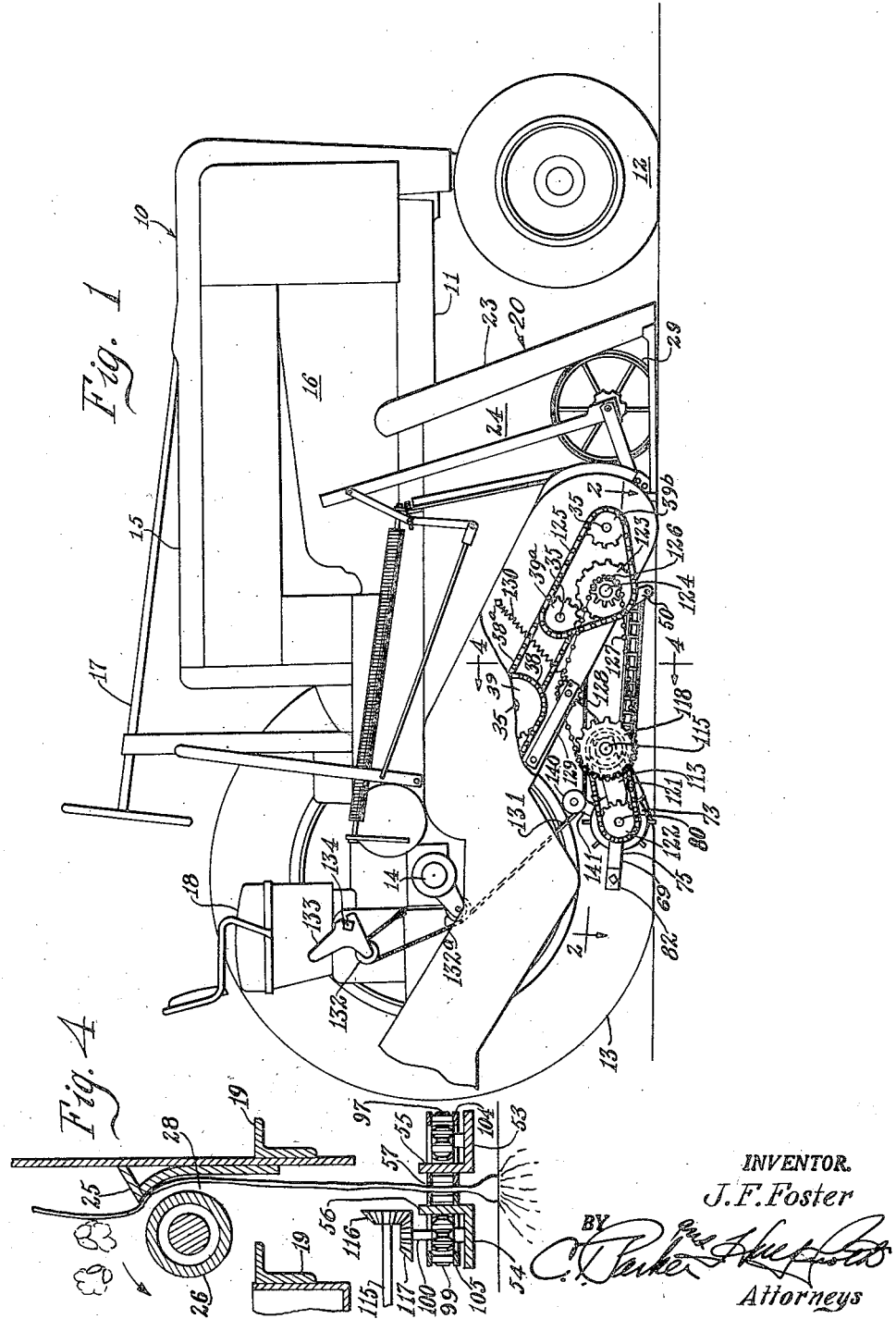

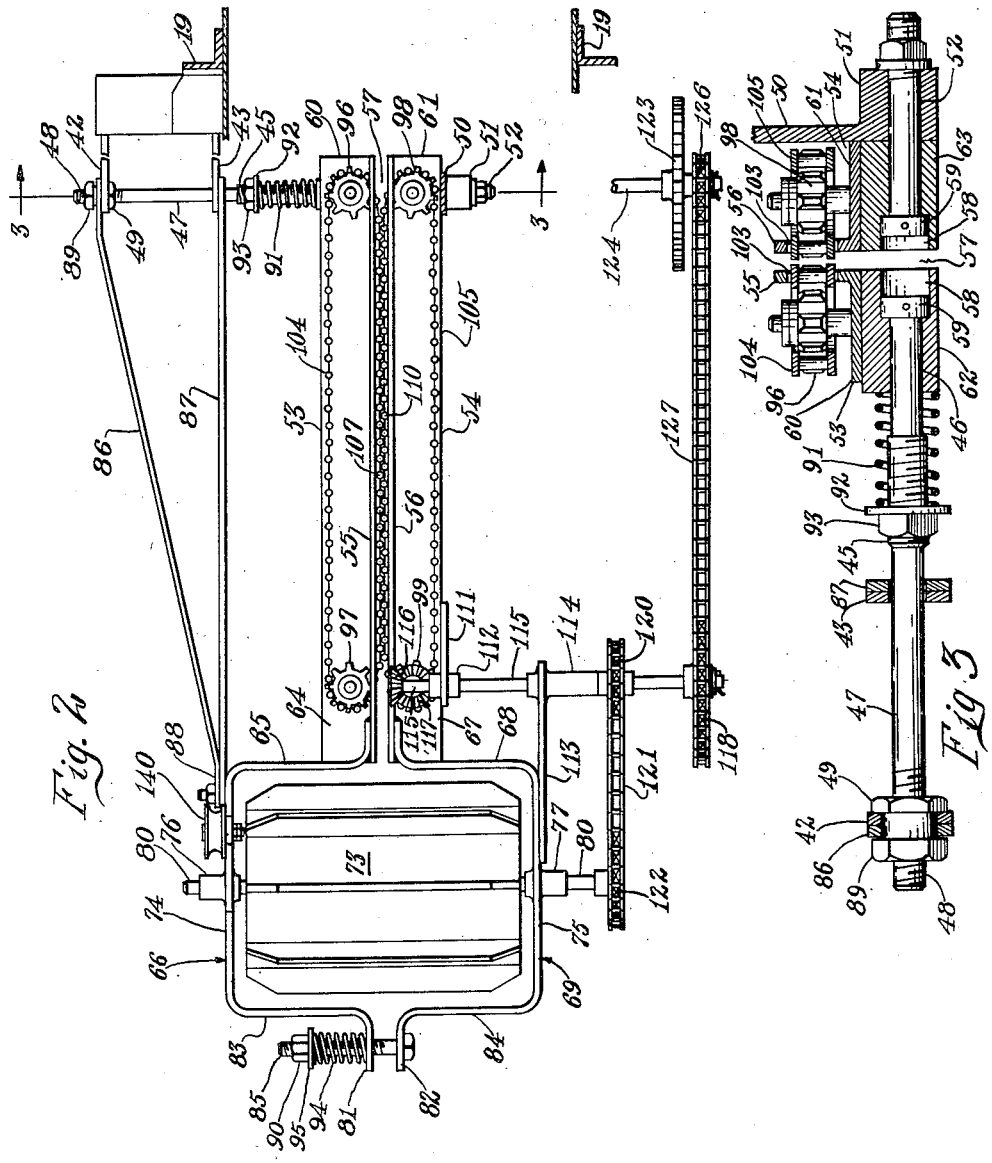

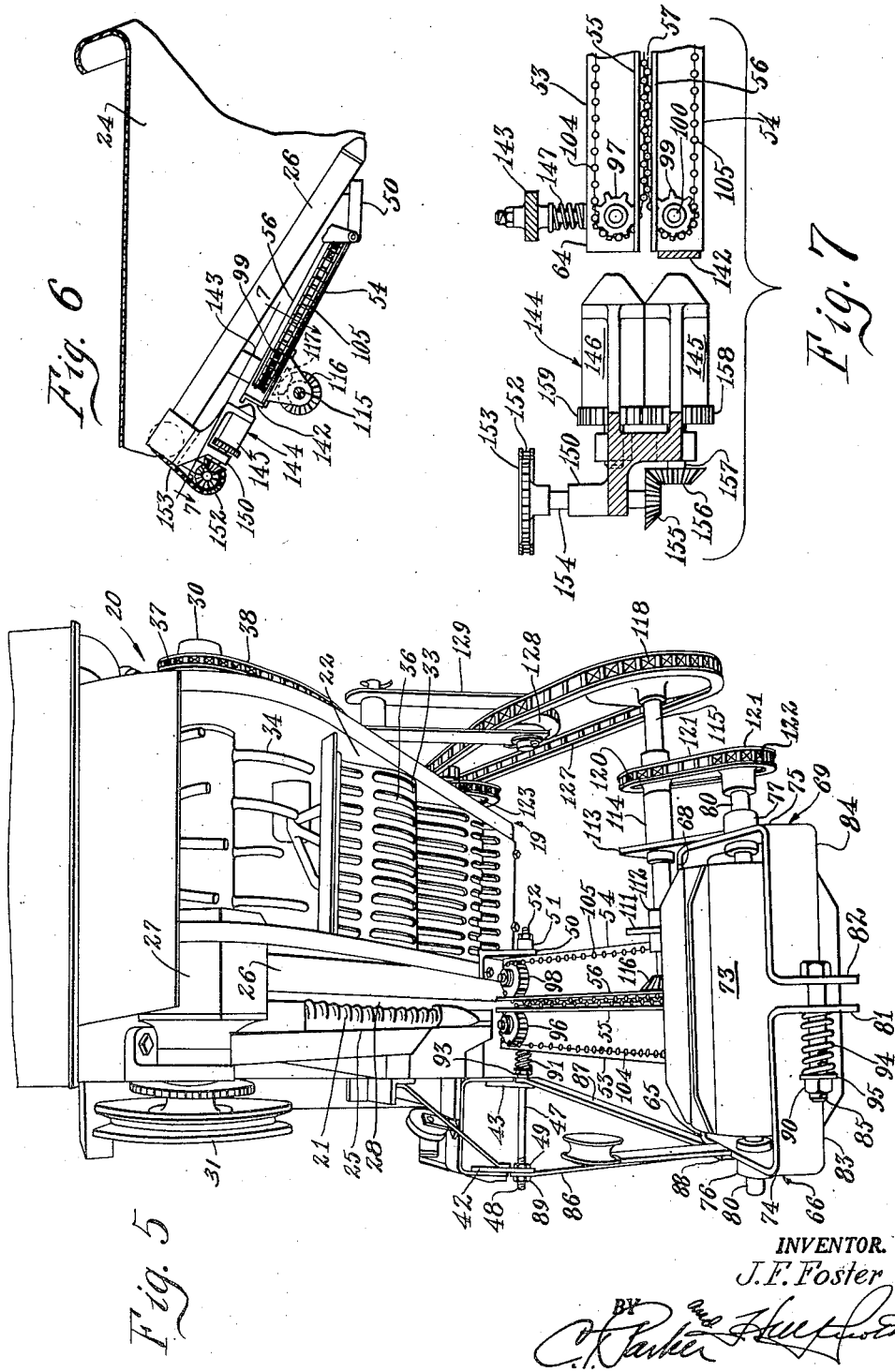

United States Patent Office 2,803,102
Patented Aug. 20, 1957

2,803,102

COTTON HARVESTER WITH ANTI-CLOGGING MEANS

Jack F. Foster, Moline, Ill., assignor to Deere & Company, Moline, Ill., a corporation of Illinois Application February 16, 1954, Serial No. 410,566

15 Claims. (Cl. 56—33)

The present invention relates generally to agricultural harvesting machines and more particularly to a harvester of the cotton stripper type and has for its principal purpose the provision of gripping means of a new and novel nature in which the stalk is gripped against upward movement as the stripper is removing the cotton.

In the past considerable trouble has occurred in the cotton stripper art due to uprooted and broken stalks entering the harvesting unit and wrapping themselves about various mechanisms on the unit and eventually clogging the system sufficiently to force a stoppage while the operator removed the trash, foreign matter, and stalks that have been pinned to the harvester mechanisms by the web-like interlacing of several uprooted plants. This trouble occurred not only due to uprooted and broken stalks being permitted to enter the system but also due to insufficient means of throwing or discarding such plants once they had entered the system.

It is, therefore, one of the main purposes of this invention to provide anti-clogging means of a preventive nature in which the stalks are retarded from entering the harvesting unit. This is done by a gripping means in the form of two endless driven elements having inner and outer runs of which the inner runs are so located relative to one another as to form therebetween a narrow fore-and-aft extending passageway through which the row of cotton is allowed to pass, said passageway being also located directly beneath the stripper rolls and having the inner runs in such close proximity to one another as to grip the stalks as they move through the passageway.

It is also a primary object of this invention to provide a stalk reducing device attached at the rear of the harvester which serves to engage the stalks leaving the aforementioned passageway and to forcibly withdraw them from the vicinity of the harvester.

It is a further object of the invention to provide suitable and simple driving means for the endless elements and stalk reduction device drawn from accessible sources on the harvester.

It is still a further object of this invention to provide lifting means interconnected to lifting means on the harvester in which both the stalk engaging and stalk reducing means are raised to a transport position at the same time the harvester is raised.

Other objects will be apparent to those skilled in the art after a consideration of the following description in which reference is had to the drawings appended hereto, in which:

Fig. 1 is a side elevation of a tractor mounted cotton stripper embodying the invention, with portions of external shielding broken away to expose background structure.

Fig. 2 is an enlarged sectional view as seen along the line 2—2 of Fig. 1, of the inventive structure.

Fig. 3 is an enlarged sectional view taken along the line 3—3 of Fig. 2.

Fig. 4 is an enlarged cross sectional view taken along the line 4—4 of Fig. 1 and showing the position of a cotton plant as it is being harvested.

Fig. 5 is an enlarged rear perspective view looking forwardly at the bottom portion of the stripper and downwardly on the anti-clogging means, with the latter swung downwardly somewhat for clarity.

Fig. 6 is a fragmentary side elevational view, partly in section along a vertical plane extending between the stripper roll and cleaning unit, showing another form of the invention in which the endless elements are inclined upwardly and rearwardly followed by two cylindrical rolls having longitudinally extending axes that cooperate to engage and forcibly withdraw the stalks from the passageway by a wringer type action.

Fig. 7 is a sectional view taken along the line 7—7 of Fig. 6.

Referring now to the drawings, the tractor is indicated in its entirety by numeral 10 and comprises a narrow longitudinally extending framework 11 supported at one end by two front wheels 12 and at the other end by two laterally spaced rear wheels 13 mounted on a rear transverse axle 14. The tractor body 15, engine 16, steering system 17, seat 18 and other parts are not unlike those common to standard commercial models and are carried on the framework 11 and rear axle 14.

The cotton stripper 20 is also of a usual commercial model and will be described for present purposes not in detail but only generally. For a complete description, reference should be made to U. S. Patent 2,533,510. The cotton stripper has a supporting frame 19 mounted on the tractor for vertical swinging about the rear axle 14. The harvester consists basically of a harvesting unit 21 and cleaning unit 22 mounted on the supporting framework 19 and laterally positioned outward of the tractor framework 11 and inward of one of the rear wheels 13. The forward end of the harvester is gauged by a gauge wheel 29 journaled to an axle.

The harvesting unit 21 includes at its forward section a plant receiving hood 23 which is arched over the row of plants as they pass through the unit. Extending rearwardly from the vertical portion of the hood 23 are two side panels 24 that guide the plants into an intermediate portion of the harvesting unit 21 which includes an upwardly and rearwardly extending stripper bar 25 cooperating with a rotating stripper roll 26 journaled at its upward and rearward end in a gear casing 27 to form a fore-and-aft extending plant receiving passage 28 into which plants are successively received as the harvester advances along a row. A main drive shaft 30 extends transversely through the gear casing 27. The roll 26 as shown is of one of the types described in detail in U. S. Patents 2,503,128 and 2,662,360 and which forcibly detaches the cotton from the plant as it moves through the unit. The cleaning unit 22 contains a plurality of rotatable cleaning devices in the form of pin rolls 34 mounted on transverse pin roll shafts 35 and the main drive shaft 30 that agitates the harvested cotton causing a gravitational separation of the dirt and foreign matter from the cotton, with the former dropping through openings 36 in the bottom of the housing 33 and drives the cotton moving upwardly to a discharge end at the rear end of the cleaning unit.

A driveshaft sprocket 37 is fixed to the main drive shaft 30 outwardly of the cleaning unit 22 and to the tractor wheel side of the unit. On the other end of the drive shaft 30 on the tractor frame side of the unit is keyed a drive pulley 31 which receives power through a suitable source on the tractor 10.

The three upper transverse pin roll shafts 35 are driven from power received from the main drive shaft 30, the sprocket 37 and chains 38, 38a which are trained over respective sprockets 39, 39a, each fixed to a respective pin roll shaft 35.

A pair of brackets 42, 43 serving as first connecting means between the harvester are fixed to a forward lower portion of the harvester supporting framework 19 and extend rearwardly beneath the harvester. The rear portion of the brackets 42, 43 are apertured to receive the reduced end section 47 of a transverse shaft 45, with the aperture of the bracket 42 being enlarged to fit over a laterally adjustable collar and nut assembly 49 mounted over a threaded end 48 of the section 47.

Second connecting means in the form of an additional bracket 50 fixed to the framework 19 and transversely spaced from the brackets 42, 43 also extend rearwardly beneath the harvesting unit. A rear portion 51 is apertured to receive a transverse shaft 52, the rear portion being enlarged to impart rigid support to the shaft. Both transverse shafts 45 and 51, as is apparent from the drawings, contain a common transverse axis.

Two horizontally disposed L-shaped elongated structural members 53 and 54, laterally spaced apart and generally parallel to the ground, have vertical portions 55 and 56 respectively obtaining between them a narrow fore-and-aft stalk receiving passageway 57 located under and substantially in vertical alignment with the plant receiving passage 28, and have front portions 60 and 61 fixed to a pair of stabilizing mountings 62 and 63 respectively. The mounting 62 is apertured to receive for pivotal movement a reduced end portion 46 of the shaft 45 and the other mounting 63 is apertured to receive for pivotal movement the shaft 52. Both apertures 58 are enlarged at their inner end to contain a locking collar 59 for restricting the shafts against lateral movement relative to the mountings 62 and 63. A rear portion 64 of the member 53 is fixed to a forward transversely extending leg 65 of a horizontally disposed U-shaped frame member 66. Similarly a rear portion 67 of the member 54 is fixed to a forward transversely extending leg 68 of a U-shaped frame member 69, both U-shaped frame members 66 and 69 being of similar size and serving as a structural framework and connecting means for a stalk reducing device 73. Longitudinally extending crossbars 74 and 75 of the respective U-shaped members 66 and 69 have hubs 76 and 77 to support a transverse drive shaft 80 which carries and drives the stalk reducing or engaging device 73. Flanges 81 and 82 extend rearwardly from rear transverse legs 83 and 84 of the U-shaped members 66 and 69 and are apertured to receive a connecting bolt 85.

Two rearwardly converging frame members 86 and 87 serving as stabilizing structures are mounted at their forward ends on the transverse shaft 45 and have a converged rear portion 88 fixed as by welding to the crossbar 74 of the U-shaped member 66.

The entire framework containing the anti-clogging means is pivotally mounted for vertical swinging about a transverse horizontal axis defined by the common axis of the transverse shafts 45 and 52.

As shown clearly in Fig. 3, the position of the adjusting nut 89 and the collar nut assembly 49 determines the ultimate lateral position of the forward portion 60 and consequently the width of the passageway 57. A spring 91 acting between a collar 92 and the mounting 62 and adjustable through a nut 93 serves as a yieldable biasing element or means acting on the structural member 53 and urging that member toward the structural member 54 at the right of the passageway 57. Similar biasing means comprising a spring 94, collar 95, and adjusting nut 90 is mounted on the connecting bolt 85.

A pair of front and rear rotating parts in the form of sprockets 96 and 97 are journaled to the left of the passageway 57 on stub shafts mounted on the respective front portion 60 and rear portion 64 of the structural member 53. On the right of the passageway 57 corresponding rotating sprockets are used with a forward sprocket 98 journaled on a stub shaft mounted on the respective front portion 61 of the structural member 54 and a rear sprocket 99 keyed to a vertical drive shaft 100 on the rear portion 65 of the structural member 54.

Slots 103 are cut into the vertical portions 55 and 56 of the two L-shaped members 53 and 54 so as to permit a segment of the sprockets 96, 97, 98, 99, to extend through into the passageway 57.

A pair of endless flexible conveyor elements, here in the form of link or roller chains 104 and 105, respectively have inner and outer portions or runs and front and rear loops or ends mounted over the respective front and rear sprockets with the chain 104 on the left of the passageway 57 having its inner run 107 extending fore-and-aft and cooperating and interlocking (in the absence of stalks) with the inner run 110 of the opposite chain 105 to the right of the passageway.

As shown in Fig. 2 the inner runs of the chains 104 and 105 extend through the elongated slots 103 and consequently receive lateral support by the vertical portions 55 and 56 of the L-shaped structural members 53 and 54 at all points intermediate the sprockets, and thus the vertical portions 55 and 56 act to back up the inner runs throughout their lengths.

A bracket 111 is fixed to the structural member 54, extends upwardly and rearwardly and carries at its upper end a bearing housing 112. A bracket 113 is fixed to the longitudinally extending crossbar 75 of the U-shaped member 69 and extends upwardly and forwardly, carrying at its upper end a bearing housing 114. The two bearing housings 112 and 114 support a power transmitting shaft 115, to one end of which is keyed to bevel pinion 116 which meshes with a bevel gear 117 mounted on the vertical drive shaft 100. Keyed to the other end of the shaft 115 is a driven sprocket 118. Intermediate the ends of the shaft 115 a stalk reducing drive sprocket 120 and a chain 121 are mounted to transmit power used to drive the stalk reducing device 73 through the medium of a driven sprocket 122 mounted on shaft 80.

Driving means are mounted on the harvester and are connected to the power transmitting shaft 115 for transmitting power to both the reducing device and the right rear rotating part or sprocket 99 to positively drive the inner run 110 to the right of the passageway 57 rearwardly and comprises a reducing sprocket 123 fixed on a supporting shaft 124 and driven by a chain 125 and the pin roll sprocket 39a mounted on the pin roll shaft 35. The chain 125 is also trained over a forward sprocket 39b which is fixed to the pin roll shaft 35 of the forward pin roll. Laterally outwardly of the reducing sprocket 123 and fixed to the supporting shaft 124 is a drive sprocket 126 cooperating with a chain 127 to drive the driven sprocket 118. Intermediate the drive sprocket 126 and driven sprocket 118 is an idler sprocket 128 mounted between two depending brackets 129 pivotally connected to the stripper supporting frame 19. Spring tensioning means 130 serves to take up slack in the chain while the stalk gripper is being used and also while the anti-clogging means is in the transport position.

The lift system for carrying the harvester in transport position is described in the aforementioned U. S. Patent 2,533,510 and repetitious detail is not necessary for this disclosure. It basically consists of the gathering unit 20 being raised or lowered about the axis of the drive shaft 30 by means of a lifting cable 131 connected at one end to the tractor body and threaded over a pulley 132 mounted on one leg of a bell crank 133 which in turn is manipulative through the tractor power lift rockshaft 134. The other end of the cable 131 being connected to the forward portion of the harvester causes the unit to pivot about the shaft 30 upon movement of the rockshaft.

The lift means described in the above named patent is modified here to lift the anti-clogging means by threading the cable 131 under an axle by-pass pulley 132a and a lifting pulley 140 mounted on a pulley bracket 141 fixed to the longitudinally extending crossbar 74. As can best be seen in Fig. 1 clockwise swinging of a bell crank 133 will first cause the stalk gripping unit to swing about the forwardly located transverse shafts 45 and 52 raising the rear portion including the stalk reducing member. As the slack is taken up in the cable 131 the front section of the harvester is also raised as well as the forward portion of the stalk gripping unit.

Figures 6 and 7 show another form of the invention in which the stalk gripping unit is inclined to the horizontal and is generally parallel to the angle of inclination of the stripper roll 26. The L-shaped structural members 53 and 54 are held fixed in the inclined position by brackets 142 and 143 depending from the harvester supporting framework 19. An adjustable biasing assembly 147 reacting between the bracket 143 and the rear portion 64 of the structural member 53 serves as yieldable means to maintain proper width of the passageway 57.

The basic means of mounting and driving the endless elements 104 and 105 are similar to that previously described. The stalk reducing means 144 comprises a pair of cylindrical rolls 145 and 146 having parallel fore-and-aft extending axes and cooperatively mounted on a rigid support 150 to produce therebetween a wringer type action.

Power for driving the stalk reducing means is received from the drive shaft 30 through a sprocket 152 and chain drive 153 mounted on a transverse stalk reducing drive shaft 154 also carried by the support 150.

A gear train arrangement comprising a bevel pinion 155 mounted on the stalk reducing drive shaft 154, a cooperating bevel gear 156 fixed to a fore-and-aft extending cylindrical roll supporting shaft 157, a ring pinion 158 fixed to the rear surface of the cylindrical roll 145 and a corresponding and meshing ring gear 159 mounted on the cylindrical roll 146 serve as the force transmitting means from the sprocket 152 and chain drive 153 to the stalk reducing unit 144.

While the sizes of sprockets and gears have not been described, nor were they meant to be, as a part of this invention, it should be here noted that the more perfect conditions under which this invention may properly operate occur when the gear and sprocket sizes and arrangements are such that the horizontal component of the rearward movement of the inner runs of the flexible elements is approximately equal to the forward progress of the harvester over the field.

The invention operates in the following manner. As the cotton plants enter the plant receiving passageway 28 between the stripper bar 25 and the stripper roll 26 the stalks or lower portions enter the stalk gripping passageway defined in its narrowest limit by the two inner runs of the endless elements. The inner runs receive and engage therebetween the stalks of the cotton plants moving through the plant receiving passageway 28 so as to retard upward movement of the stalks as the cotton is being detached. The inner runs move rearwardly at approximately the same rate of speed as the harvester moves forwardly over the ground, causing the stalks to leave the plant receiving and stalk gripping passageway at the same time. As a further adjunct of the invention, uprooted plants are prevented from entering the harvester not only by the gripping action of the endless elements but also by the condition that the enlarged rooted portion of the stalk is of generally such large proportion as to prevent upward movement through the narrow passageway defined by the L-shaped structural members 53 and 54 and the inner runs.

As the cotton plant leaves the plant and stalk passageways it is brought into contact with the rotatable stalk reducing device which serves two purposes, first to engage and forcibly withdraw the plant from the harvester unit and second to reduce or break up the stalk. In the first form of the invention the stalk reducing device comprises a tromper type roll rotatable on the transverse drive shaft 30 and proximate to the ground that engages the stalk between it and the ground as it rolls over it causing the stalks to be withdrawn downwardly from the harvesting unit and also breaking it up. In the second form of the invention the wringer rolls tend to withdraw the stalks from the harvesting unit as it forcibly draws them downwardly and crushes the stalk between the rolls.

Various details of the structures illustrated may be varied to suit particular situations. Features of the invention not particularly pointed out will readily occur to those versed in the art as will variations suggested by the present disclosure, all of which may be achieved without departing from the spirit and scope of the invention as defined in the appended claims.

I claim:

1. Anti-clogging means for use with a cotton harvester having a supporting frame and a harvesting unit on the frame including means defining a fore-and-aft extending plant receiving passageway into which plants are successively received as the harvester advances along a row, comprising: a pair of fore-and-aft extending elongated structural members laterally spaced apart and each having front and rear end portions, front and rear rotating parts mounted respectively on the front and rear end portions of the members, a pair of endless flexible elements mounted on the rotating parts and each having inner and outer runs, the inner runs being closely spaced apart laterally and forming a fore-and-aft extending stalk receiving passageway located under and substantially in vertical alinement with the plant receiving passageway, said inner runs receiving and engaging therebetween the stalks of the cotton plants moving through the plant receiving passageway so as to retard upward movement of the stalks as the cotton is harvested, driving means on the harvester and connected to at least one of the rotating parts to positively drive at least one of the elements such that the inner run of said one element moves rearwardly, means connecting the members to the harvester and including provision for vertical movement of the members relative to the harvester, said means including biasing elements acting on at least one of the members and yieldably urging one member toward the other member to restrict the lateral dimension of the stalk receiving passageway, a rotatable stalk engaging device positioned rearwardly of and in fore-and-aft alinement with the stalk receiving passageway to engage stalks exiting from said stalk receiving passageway, said device including means causing said device to rotate in such direction so as to compel stalks engaged thereby to move downwardly, and means connecting the stalk engaging device to the harvester for advance therewith.

2. The invention defined in claim 1, including: lift means on the harvester and connected to the members and to the stalk engaging device for lifting said members and device respectively to transport positions.

3. The invention defined in claim 1, in which: the stalk engaging device rotates on a transverse axis proximate to the ground so that the device engages the ground.

4. Anti-clogging means for use with a cotton harvester having a supporting frame and a harvesting unit on the frame including means defining a fore-and-aft extending plant receiving passageway into which plants are successively received as the harvester advances along a row, comprising a pair of fore-and-aft extending elongated structural members laterally spaced apart and each having front and rear end portions, front and rear rotating parts mounted respectively on the front and rear end portions of the members, a pair of endless flexible elements mounted on the rotating parts and each having inner and outer runs, the inner runs being closely spaced apart laterally and forming a fore-and-aft extending stalk receiving passageway located under and substantially in vertical alinement with the plant receiving passageway, said inner runs receiving and engaging therebetween the stalks of the cotton plants moving through the plant receiving passageways so as to retard upward movement of the stalks as the cotton is detached from the stalks, driving means on the harvester and connected to at least one of the rotating parts to positively drive at least one of the elements such that the inner run of said one element moves rearwardly, means connecting the members to the harvester and including provision for vertical movement of the members relative to the harvester, said means including biasing elements acting on at least one of the members yieldably urging one member toward the other member to restrict the lateral dimension of the stalk receiving passageway.

5. Anti-clogging means for use with a cotton harvester having a supporting frame and a harvesting unit on the frame including means defining a fore-and-aft extending plant receiving passageway into which plants are successively received as the harvester advances along a row, comprising: a pair of fore-and-aft extending elongated structural members laterally spaced apart and each having front and rear end portions, front and rear rotating parts mounted respectively on the front and rear end portions of the members, a pair of endless flexible elements mounted on the rotating parts and each having inner and outer runs, the inner runs being closely spaced apart laterally and forming a fore-and-aft extending stalk receiving passageway located under and substantially in vertical alignment with the plant receiving passageway, said inner runs receive and engage therebetween the stalks of the cotton plants moving through the plant receiving passageway so as to retard upward movement of the stalks as the cotton is detached from the stalks, means connecting the members to the harvester and including provision for vertical movement of the members relative to the harvester, said means including biasing elements acting on at least one of the members and yieldably urging one member toward the other member to restrict the lateral dimension of the stalk receiving passageway.

6. Anti-clogging means for use with cotton harvester having a supporting frame and a harvesting unit on the frame including means defining a fore-and-aft extending plant receiving passageway into which plants are successively received as the harvester advances along a row, comprising: a pair of fore-and-aft extending elongated structural members laterally spaced apart and each having front and rear end portions, front and rear rotating parts mounted respectively on the front and rear end portions of the members, a pair of endless flexible elements mounted on the rotating parts and each having inner and outer runs, the inner runs being closely spaced apart laterally and forming a fore-and-aft extending stalk receiving passageway located under and substantially in vertical alignment with the plant receiving passageway, said inner runs receiving and engaging therebetween the stalks of the cotton plants moving through the plant receiving passageway so as to retard upward movement of the stalks as the cotton is detached from the stalks, and means connecting the members to the harvester.

7. Anti-clogging means for use with a cotton harvester having a supporting frame and a harvesting unit on the frame including means defining a fore-and-aft extending plant receiving passageway into which plants are successively received as the harvester advances along a row, comprising: a pair of fore-and-aft extending elongated structural members laterally spaced apart and each having front and rear end portions, a pair of fore-and-aft moving elements having front and rear ends mounted respectively on the front and rear end portions of the respective members and having inner portions closely spaced apart laterally and forming a fore-and-aft extending stalk receiving passageway located under and substantially in vertical alignment with the plant receiving passageway, said inner portions receiving and engaging therebetween the stalks of the cotton plants moving through the plant receiving passageway so as to retard upward movement of the stalks as the cotton is detached from the stalks, means positively driving at least one of the element such that its inner portion travels rearwardly, and means connecting the members to the harvester.

8. Anti-clogging means for use with a cotton harvester having a supporting frame and a harvesting unit on the frame including means defining a fore-and-aft extending plant receiving passageway into which plants are successively received as the harvester advances along a row, comprising: a pair of fore-and-aft extending elongated structural members laterally spaced apart and each having front and rear end portions, front and rear rotating parts mounted respectively on the front and rear end portions of the members, a pair of endless flexible elements mounted on the rotating parts and each having inner and outer runs, the inner runs being closely spaced apart laterally and forming a fore-and-aft extending stalk receiving passageway located under and substantially in vertical alinement with the plant receiving passageway, said inner runs receiving and engaging therebetween the stalks of the cotton plants moving through the plant receiving passageway so as to retard upward movement of the stalks as the cotton is detached from the stalks, means positively driving at least one of the elements such that the inner run of said one element moves rearwardly, means connecting the members to the harvester, said means including biasing means acting on at least one of the members and yieldably urging one member toward the other member to restrict the lateral dimension of the stalk receiving passageway.

9. Anti-clogging means for use with a cotton harvester having a supporting frame and a harvesting unit on the frame including means defining a fore-and-aft extending plant receiving passageway into which plants are successively received as the harvester advances along a row, comprising: a pair of fore-and-aft extending elongated structural members laterally spaced apart and each having front and rear end portions, front and rear rotating parts mounted respectively on the front and rear end portions of the members, a pair of endless flexible elements mounted on the rotating parts and each having inner and outer runs, the inner runs being closely spaced apart laterally and forming a fore-and-aft extending stalk receiving passageway located under and substantially in vertical alinement with the plant receiving passageway, said inner runs receiving and engaging therebetween the stalks of the cotton plants moving through the plant receiving passageway so as to retard upward movement of the stalks as the cotton is detached from the stalks, means driving at least one of the rotating parts to positively move the inner run of the respective element rearwardly, and means connecting the members to the harvester.

10. The invention defined in claim 9 in which the structural members respectively have upright portions located outwardly of and proximate to the respective inner runs and serve as backing means for the flexible elements intermediate the rotating members.

11. The invention defined in claim 9 in which the rotating parts are sprockets and the flexible elements are roller chains.

12. Anti-clogging means for use with a cotton harvester having a supporting frame and a harvesting unit on the frame including means defining a fore-and-aft extending plant receiving passageway into which plants are successively received as the harvester advances along a row, comprising: a pair of fore-and-aft extending elongated stalk-engaging members proximate and generally parallel to the ground and closely spaced apart laterally and forming a fore-and-aft extending stalk receiving passageway located under and substantially in vertical alinement with the plant receiving passageway for receiving and engaging therebetween the stalks of the cotton plants moving through the plant receiving passageway so as to retard upward movement of the stalks as the cotton is detached from the stalks, means connecting the members to the harvester, a rotatable stalk engaging device positioned rearwardly of and in fore-and-aft alinement with the stalk receiving passageway to engage stalks exiting from said stalk receiving passageway, said device including means causing said device to rotate in such direction so as to compel stalks engaged thereby to move downwardly, and means for connecting the stalk engaging device to the harvester for advance therewith.

13. The invention defined in claim 9 further characterized by a stalk engaging device connected rearwardly of the stalk receiving passageway and to said harvester comprising a pair of cooperating rolls having parallel fore-and-aft extending axes and means causing said rolls to rotate to produce a wringer type action therebetween for engaging and forcibly expelling stalks exiting from the stalk receiving passageway.

14. In a cotton harvester having a supporting frame movable over a field of row planted cotton plants including cotton-bearing ground-borne stalks and a harvesting unit on the frame including means defining a fore-and-aft extending plant receiving passageway into which plants are successively received as the harvester advances along a row, and further having means along the passageway for forcibly detaching cotton from the stalks: the invention residing in anti-clogging means comprising a pair of fore-and-aft extending elongated stalk engaging members forming a fore-and-aft extending stalk receiving passageway located under and substantially in vertical alinement with and generally parallel to the plant receiving passageway for receiving and engaging therebetween the stalks of the cotton plants moving through the plant receiving passageway so as to retard upward movement of the stalks as the cotton is detached from the stalks, means connecting the members to the harvester, said means including biasing elements acting on one of the members and yieldably urging said one member toward the other member to restrict the lateral dimension of the stalk receiving passageway, a stalk engaging device connected proximately and rearwardly of the stalk receiving passageway and to said harvester comprising a pair of cooperating rolls having parallel fore-and-aft extending axes and means causing said rolls to rotate to produce a wringer type action therebetween for engaging and forcibly expelling stalks exiting from the stalk receiving passageway.

15. In a cotton harvester having a supporting frame movable over a field of row planted cotton plants including cotton-bearing ground-borne stalks and a harvesting unit on the frame including means defining a fore-and-aft extending plant receiving passageway into which plants are successively received as the harvester advances along a row, and further having means along the passageway for forcibly detaching cotton from the stalks: the invention residing in anti-clogging means comprising a pair of fore-and-aft extending elongated stalk engaging members forming a fore-and-aft extending stalk receiving passageway located under and substantially in vertical alinement with and generally parallel to the plant receiving passageway for receiving and engaging therebetween the stalks of the cotton plants moving through the plant receiving passageway so as to retard upward movement of the stalks as the cotton is detached from the stalks, means connecting the members to the harvester, a stalk engaging device connected proximately and rearwardly of the stalk receiving passageway and to said harvester comprising a pair of cooperating rolls having parallel fore-and-aft extending axes and means causing said rolls to rotate to produce a wringer type action therebetween for engaging and forcibly expelling stalks exiting from the stalk receiving passageway.

References Cited in the file of this patent

UNITED STATES PATENTS

| | | |
|---|---|---|
| Re. 19,411 | Rust | Jan. 1, 1935 |
| 387,061 | Natic | July 31, 1888 |
| 1,022,142 | Johnson | Apr. 2, 1912 |
| 1,646,594 | Phelps et al. | Oct. 25, 1927 |
| 1,666,824 | Johnson | Apr. 17, 1928 |
| 1,731,826 | Morava | Oct. 15, 1929 |
| 1,769,104 | Benjamin | July 1, 1930 |
| 1,774,450 | Murphy | Aug. 26, 1930 |
| 1,886,151 | Benjamin | Nov. 1, 1932 |
| 2,337,355 | Spell | Dec. 21, 1943 |
| 2,484,802 | Aasland | Oct. 18, 1949 |
| 2,635,409 | Thomann | Apr. 21, 1953 |